US006571516B2

(12) United States Patent
Nakamoto et al.

(10) Patent No.: US 6,571,516 B2
(45) Date of Patent: Jun. 3, 2003

(54) LOCKING DEVICE FOR A VEHICLE DOOR WITH A CONNECTION BETWEEN A HANDLE UNIT AND A DOOR LATCH UNIT

(75) Inventors: Yoshinori Nakamoto, Tokyo (JP); Daisuke Nakazato, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/836,376

(22) Filed: Apr. 16, 2001

(65) Prior Publication Data

US 2001/0029704 A1 Oct. 18, 2001

(30) Foreign Application Priority Data

Apr. 18, 2000 (JP) ...................................... 2000-116978

(51) Int. Cl.[7] .................................................. B60J 5/04
(52) U.S. Cl. .............................. 49/503; 49/502; 49/460
(58) Field of Search .......................... 49/503, 502, 460; 16/412, 438; 292/336.3, 348

(56) References Cited

U.S. PATENT DOCUMENTS 3,858,921 A * 1/1975 Kuki ....................... 292/336.3
4,475,415 A * 10/1984 Yamamoto ................... 74/543
4,892,342 A * 1/1990 Newman et al. ............ 292/347
5,226,259 A * 7/1993 Yamagata et al. ............ 49/502
5,340,174 A * 8/1994 Bender et al. ........... 292/336.3
5,706,554 A * 1/1998 Ruckert et al. ............... 16/412
5,752,346 A * 5/1998 Kritzler et al. ............... 49/503
5,904,002 A * 5/1999 Emerling et al. ............. 49/502
5,906,073 A * 5/1999 Hori ............................ 49/503
6,189,267 B1 * 2/2001 Staser ......................... 49/503
6,234,548 B1 * 5/2001 Mittelbach et al. ...... 292/336.3
6,241,294 B1 * 6/2001 Young et al. ............ 292/336.3

FOREIGN PATENT DOCUMENTS

JP 3221681 9/1991

* cited by examiner

*Primary Examiner*—Gregory J. Strimbu
(74) *Attorney, Agent, or Firm*—Martin A. Farber

(57) ABSTRACT

A locking device for a vehicle door in which a handle unit fixed to a door outer panel and a door latch unit fixed to a door inner panel are prevented from making a substantial shift in their relative positions for the sake of normal operation even under sideways minor impacts or the like. A door latch reinforcement for fixing the door latch unit is fixed to the door inner panel. Handle stations, to which threaded portions of the handle unit are fastened, are formed by being bent in a handle mount opening formed in the door outer panel. The door latch reinforcement and the handle stations are connected to each other with a handle bracket. Since the door latch unit and the handle unit are connected to each other via the handle bracket, the two units make no substantial shift in their relative positions even under sideways minor impacts or the like, thereby allowing the normal operation of the door lock device even after the minor impacts.

6 Claims, 7 Drawing Sheets

LOCKING DEVICE FOR A VEHICLE DOOR WITH A CONNECTION BETWEEN A HANDLE UNIT AND A DOOR LATCH UNIT

BACKGROUND OF THE INVENTION

The present invention relates to a locking device for a vehicle door which uses a handle bracket to reinforce the periphery of a handle mount opening formed in a door outer panel.

In general, a vehicle door, such as disclosed in Japanese Patent Application Laid-Open Publication No. Hei 3-221681, is constituted by joining a door outer panel and a door inner panel. A door lock device is arranged therein.

The door lock device includes a handle unit having an outer handle, and a door latch unit for engaging with a striker which is fixed to a body frame such as a center pillar. The handle unit is fixed to the inner surface of the door outer panel, and the door latch unit is fixed to the door inner panel. These two units are connected to each other via a rod.

Then, the pulling of the outer handle operates the door latch unit via the rod, whereby the engagement with the striker is released to make the door openable.

When the door outer panel is deformed by a sideways minor impact, distortion occurs between the door inner panel and the door outer panel. This distortion causes a relative position change between the handle unit fixed to the door outer panel and the door latch unit fixed to the door inner panel, thereby producing a problem that the outer handle operation no longer actuate the door latch unit normally.

The following are the countermeasures taken heretofore.

1) To pass a bracket across the door inner panel and the door outer panel to maintain the relative positional relationship between the handle unit and the door latch unit.
2) To utilize a beam or beams arranged in the door inner panel to fix the handle unit and the door latch unit to each other, thereby maintaining the relative positional relationship between the units.
3) To take advantage of the strength of the vertical wall portion (arch door latch reinforcement) at the door back end to attach the handle unit and the door latch unit thereto via brackets, for the sake of maintaining the relative positions of the two units.
4) To integrate the handle unit and the door latch unit structurally.

Nevertheless, simply passing a bracket between the door inner panel and the door outer panel often fails to absorb all the assembly errors of the individual parts, thereby causing a shift in the relative positional relationship between the handle unit and the door latch unit.

Moreover, the means of fixing the two units by utilizing the beam(s) welded to the door inner panel has problems not only of limiting the beam arrangement but also of complicating the assembly of those units.

Furthermore, the means of fixing the handle unit and the door latch unit to the arch door latch reinforcement via brackets require that a large opening for mounting these units be formed in the door inner panel. This lowers the strength of the door inner panel disadvantageously.

On the other hand, the means of structurally integrating the handle unit and the door latch unit lead to specialized parts. In this case, different models of cars must be equipped with door lock devices of different specifications, which disadvantageously complicates the parts control.

SUMMARY OF THE INVENTION

In view of the foregoing, an object of the present invention is to provide a locking device for a vehicle door which is simple in configuration, capable of sharing parts specifications, facilitated in parts control, and, in structural terms, capable of maintaining the relative positional relationship between the handle unit and the door latch unit even if the door outer panel is deformed by a sideways minor impact or the like.

To achieve the foregoing object, a first aspect of a locking device for a vehicle door according to the present invention includes handle stations arranged on both sides of a handle mount opening formed in a door outer panel, a handle unit fixed to the handle stations and for rotatably supporting an outer handle, a door latch reinforcement fixed to a door inner panel joined to the door outer panel, a door latch unit fixed to the door latch reinforcement, and a rod for connecting the handle unit and the door latch unit. Here, the door latch reinforcement is extended along the inner surface of the door outer panel to form a bracket station. A handle bracket is interposed between the door latch unit and the door outer panel. The handle bracket is fixed at one end to the bracket station, and at both edges of the other end to the handle stations along with the handle unit.

In such a configuration, the handle unit is connected via the handle bracket to the door latch reinforcement which undergoes little deformation even if the door outer panel of the door is deformed by a sideways minor impact or the like. Therefore, the relative positions of the handle unit and the door latch unit fixed to the door latch reinforcement can be maintained even after the deformation of the door outer panel.

A second aspect of a locking device for a vehicle door according to the present invention in the locking device according to the first aspect is characterized in that a latching part for temporarily fixing the handle bracket to the handle stations is formed on the handle bracket.

In such a configuration, the handle bracket is provided with the latching parts. Therefore, at the occasion of assembly, these latch parts can temporarily fix the handle bracket to the handle stations for improved assembly efficiency.

A third aspect of a locking device for a vehicle door according to the present invention in the locking device according to the first or second aspect is characterized in that the handle bracket has a long hole formed at a portion coming into contact with the bracket station, and the handle bracket is fastened to the bracket station via the long hole.

In such a configuration, since the long hole is formed in the handle bracket at a portion coming into contact with the bracket station and the handle bracket is fastened to the bracket station via the long hole, this long hole absorbs the assembly errors in the relative positional relationship between the handle bracket and the bracket station.

A fourth aspect of a locking device for a vehicle door according to the present invention in the locking device according to the third aspect is characterized in that the locking device has a bolt inserted through the long hole and projected from the bracket station toward the door inner panel, and the door latch reinforcement has a latch mount opening in a position where an end of the bolt faces.

In such a configuration, when the handle bracket is put into contact with the bracket station, the bolt projected from the bracket station is inserted through the long hole formed in this handle bracket for alignment. Then, a nut is screwed and fastened onto this bolt through the latch mount opening formed in the door latch reinforcement.

DETAILED DESCRIPTION OF THE PREFERRED EMBODIMENT

Figure 1:
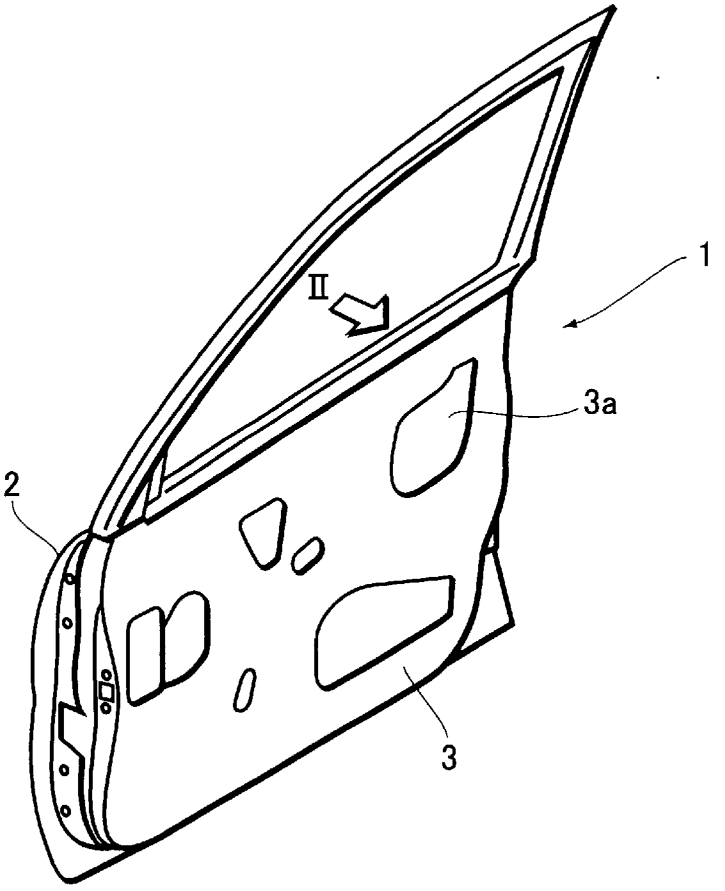
FIG. 1 is a perspective view of a vehicle door as seen from the door-inner-panel side.
Figure 2:
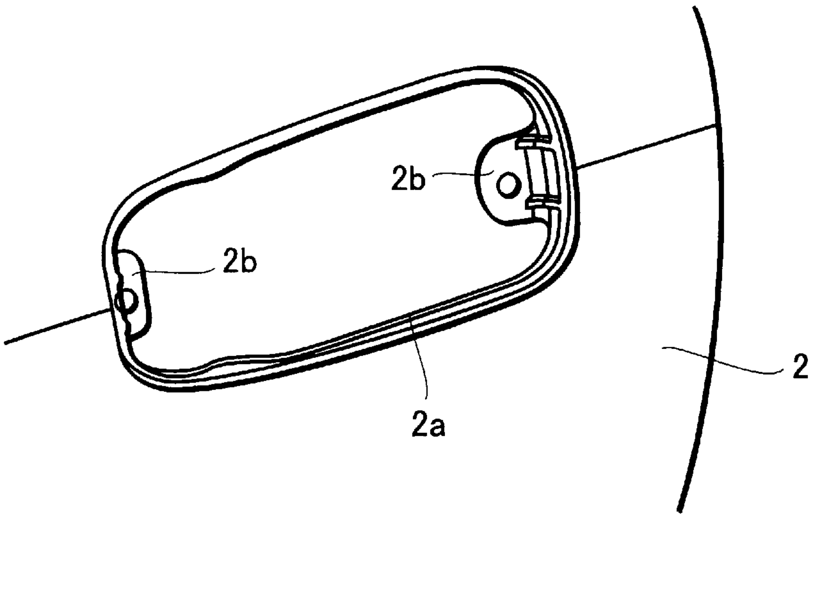
FIG. 2 is a partial enlarged view taken along the arrow II of FIG. 1.
Figure 3:
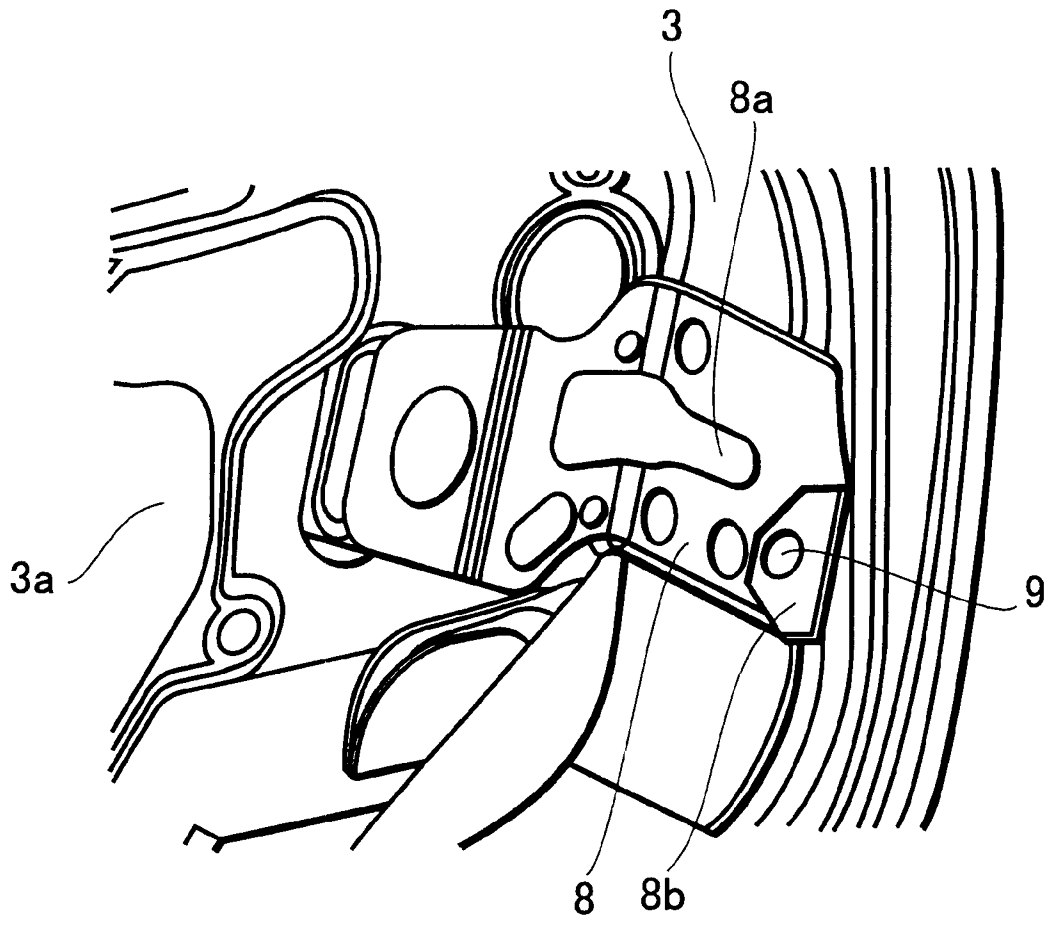
FIG. 3 is an enlarged perspective view showing the essential parts inside the door inner panel.
Figure 4:
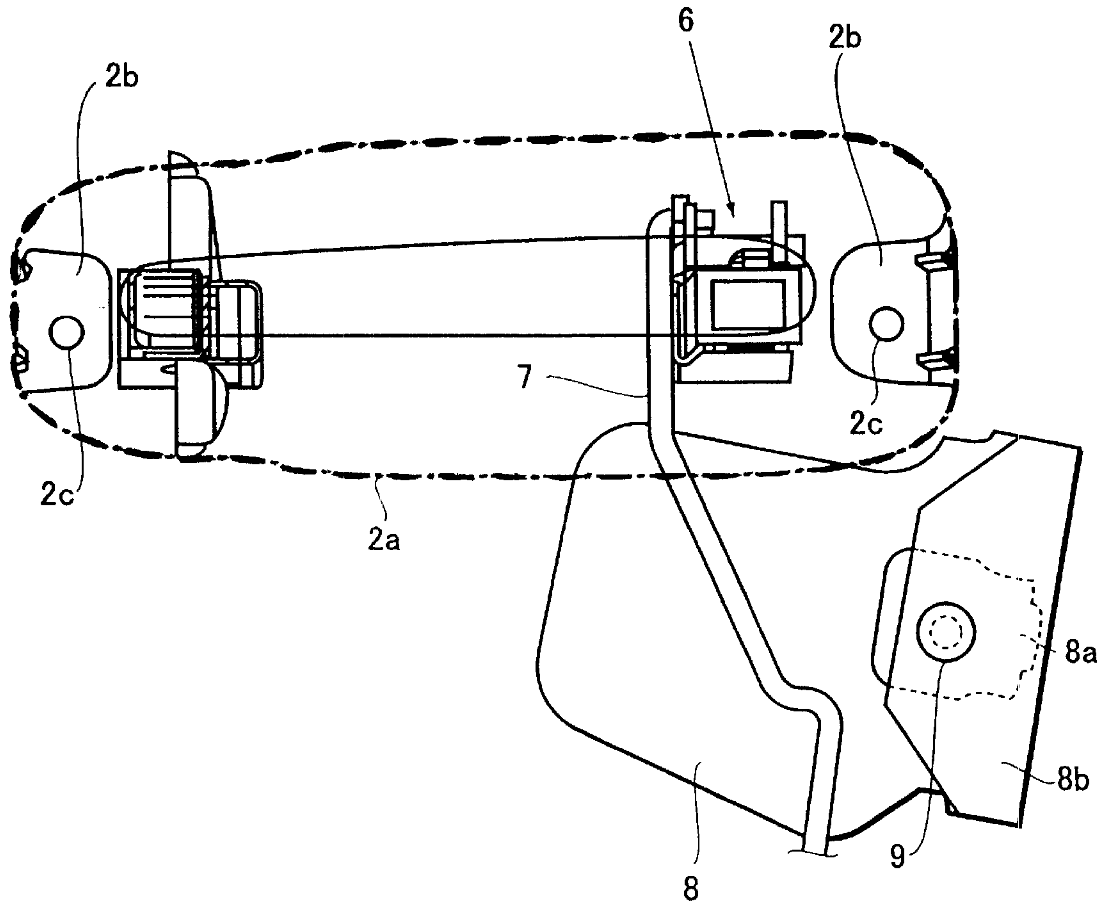
FIG. 4 is a schematic diagram of a handle unit under the situation of removing an outer panel.
Figure 5:
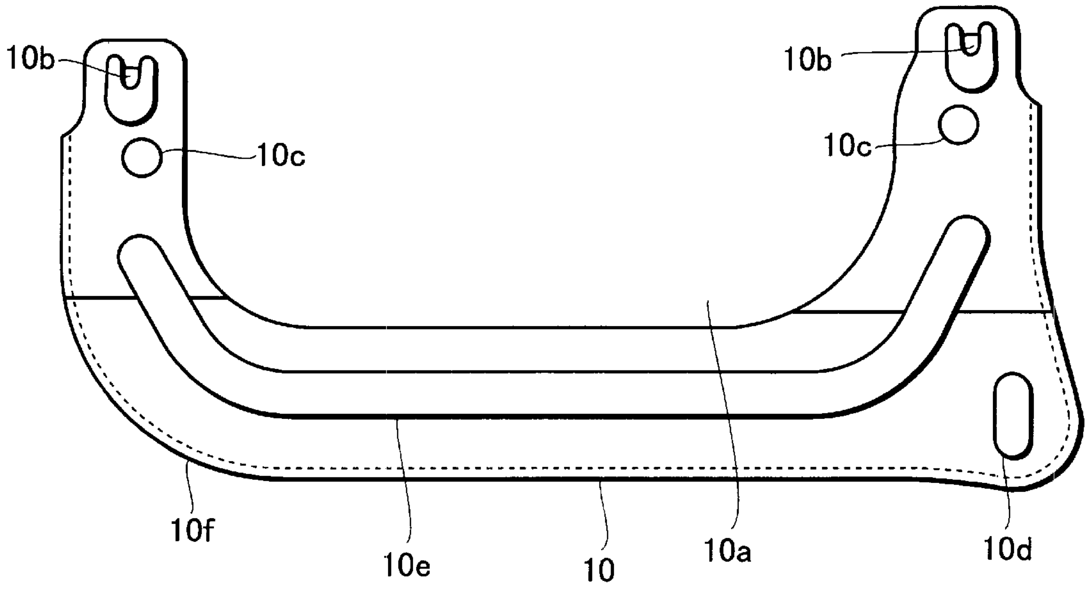
FIG. 5 is a front view of a handle bracket.

Hereinafter, an embodiment of the present invention will be described with reference to the drawings.

In the diagrams, the reference numeral 1 represents a vehicle door 1. In the present embodiment, it represents a front door. This vehicle door has a door outer panel 2 and a door inner panel 3 joined to this door outer panel 2. At its front portion, this vehicle door 1 is rotatably supported by a front pillar via a door hinge (not shown).

The vehicle door 1 also contains a door lock device 4. This door lock device 4 includes a door latch unit 5 and a handle unit 6. These units 5 and 6 are connected in a row via a rod 7.

The door latch unit 5 is arranged at a rear portion of the vehicle door 1. The vehicle door 1 is kept closed by its door latch unit 5 engaging with a door striker (not shown) fixed to a center pillar.

The door latch unit 5 is attached to a door latch reinforcement 8 which is fixed to the rear inner surface of the door inner panel 3. The door latch reinforcement 8 is provided with a latch mount opening **8*a* for guiding the door striker. It is evident that an opening of identical shape is also made in the corresponding position in the door inner panel. Incidentally, as shown in FIG. 1, the door inner panel 3 has work openings 3*a*** of various shapes formed therethrough.

This door latch reinforcement 8 is bent to form a bracket station **8*b* so as to extend along and face the inner surface of the door outer panel 2. On this bracket station 8*b* is erected a bolt (welding bolt) 9 projecting to the inside from the door-outer-panel-2 side. Note that this bolt 9 is directed to the latch mount opening 8*a* which is opened in the door latch reinforcement 8**.

Moreover, the handle unit 6 is mounted from car exterior to a handle mount opening **2*a* formed in the rear portion of the door outer panel 2. This handle mount opening 2*a* is provided at both sides with handle stations 2*b* which are bent into tongue-like shapes. Screw-setting holes 2*c* are formed through the handle stations 2*b***.

Threaded portions **6*a* are provided on both back ends of an escutcheon (not shown) which is arranged on the handle unit 6 and rotatably supports an outer handle. The threaded portions 6*a* are put into contact with the screw-setting holes 2*c***.

The reference numeral 10 represents a handle bracket which is formed by working a flat plate. The upper edges of this handle bracket 10, branched out in a U shape, are put into contact with the backsides of the handle stations **2*b***.

A U-shaped notch **10*a* in this handle bracket 10 is formed to the outside shape of the escutcheon of the handle unit 6, so as to avoid interference with the escutcheon when the handle unit 6 is mounted to the handle mount opening 2*a* in the door outer panel 2**.

The top portions of this handle bracket 10 are bent into hooks **10*b* which serve as temporal latching parts for latching onto the upper edges of the handle stations 2*b*. Besides, holes 10*c* are formed through the top portions of the handle bracket 10, at positions corresponding to the screw-setting holes 2*c* in the handle stations 2*b***.

Furthermore, an oblong, long hole **10*d* is formed in this handle bracket 10 at a portion where the bracket station 8*b* makes contact. The bolt 9 is inserted into the long hole 10*d*. The reference numeral 10*e* represents a bead, and 10*f*** a rim.

The hooks **10*b* formed on this handle bracket 10 are latched onto the upper edges of the handle stations 2*b*, and the bolt 9 erected on the bracket station 8*b* is passed through the long hole 10*d* to fix this handle bracket 10 temporarily. Here, the holes 10*c* in the handle bracket 10 coincide with the screw-setting holes 2*c* in the handle stations 2*b* formed in the handle mount opening 2*a***.

Incidentally, the reference numeral 11 represents a nut to be screwed onto the bolt 9, and 12 a bolt to be screwed into the threaded portion **6*a***.

Now, description will be given of the operation of the present embodiment having the above-described configuration.

Initially, on an assembly line, the door latch reinforcement 8 is joined to the rear inner surface of the door inner panel 3 by adhesive bonding, spot welding, or other means. Then, the door outer panel 2 is folded back at the periphery to form a clinching portion which holds the periphery of the door inner panel 3. This clinching portion is fixed by adhesive bonding, spot welding, or other means to form the vehicle door 1.

Figure 6:
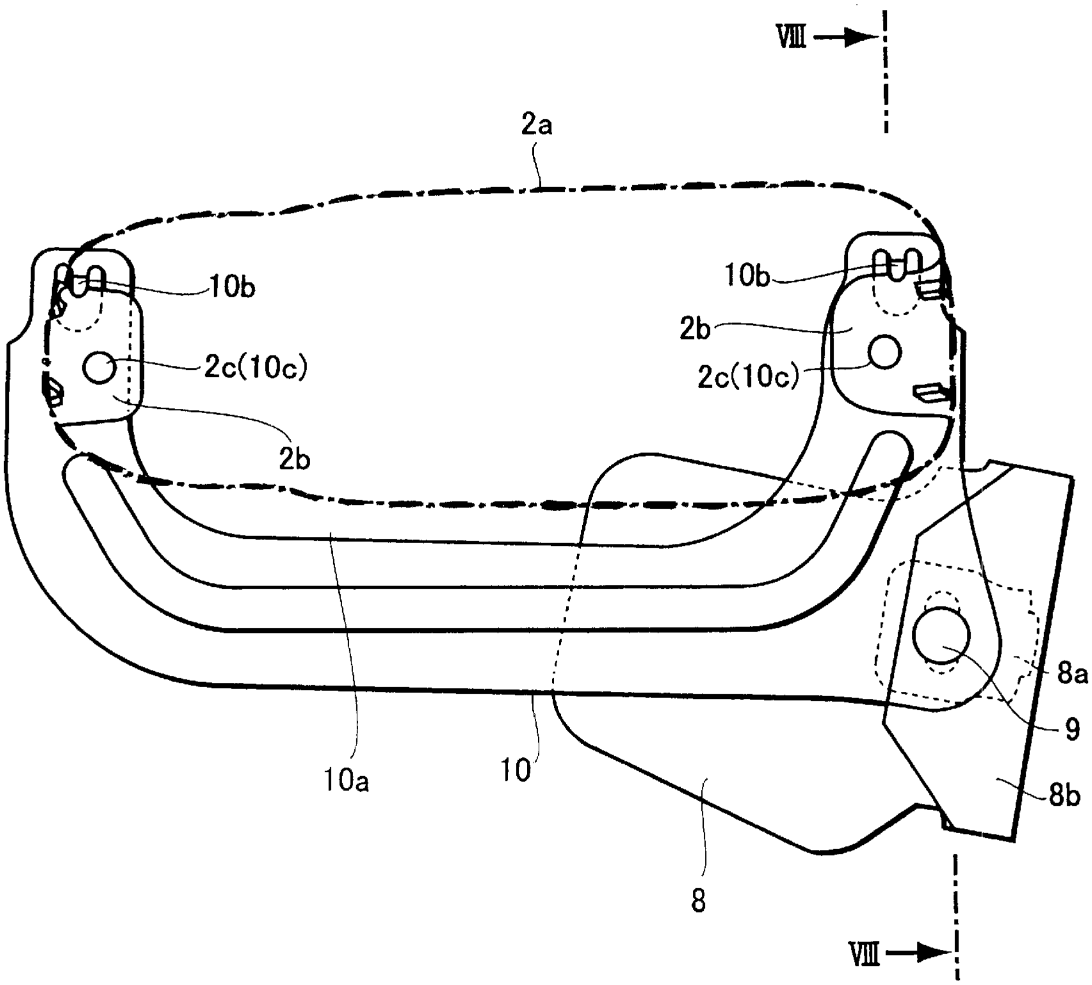
FIG. 6 is an explanatory diagram showing the handle bracket in an assembled state under the situation of removing an outer panel.
Figure 7:
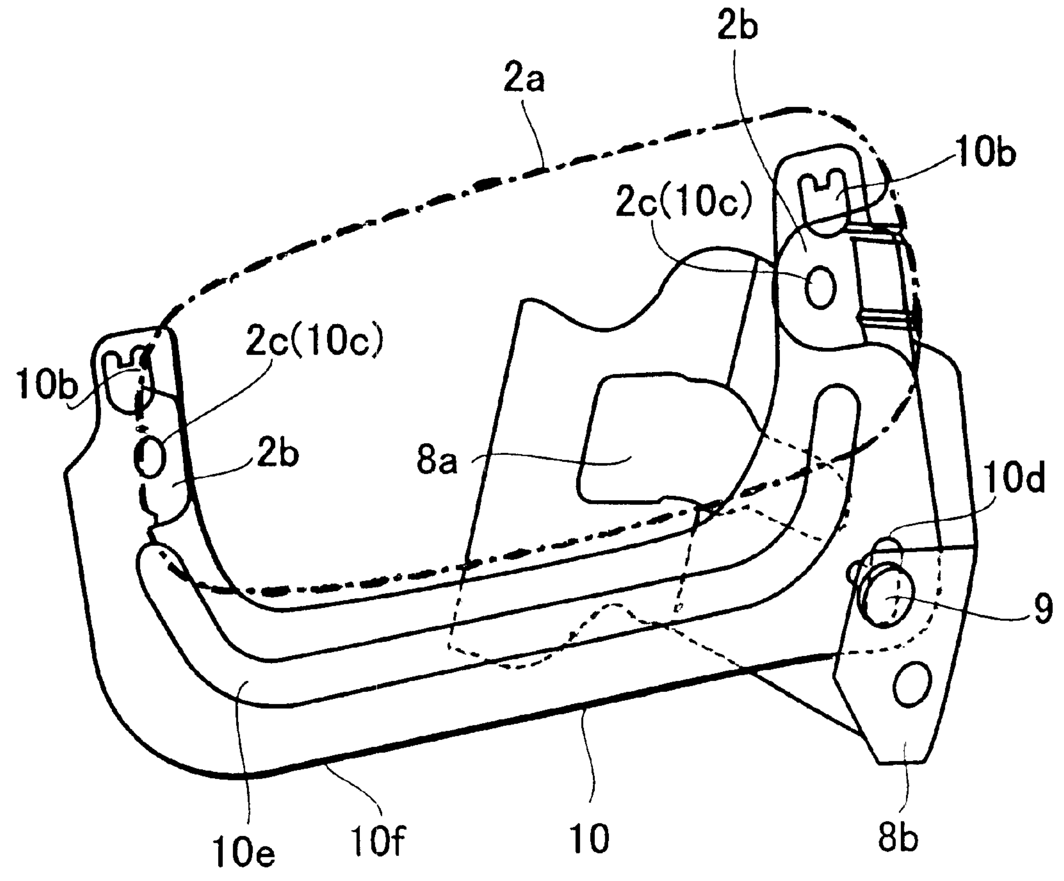
FIG. 7 is a perspective view showing the handle bracket in an assembled state under the situation of removing an outer panel.
Figure 8:
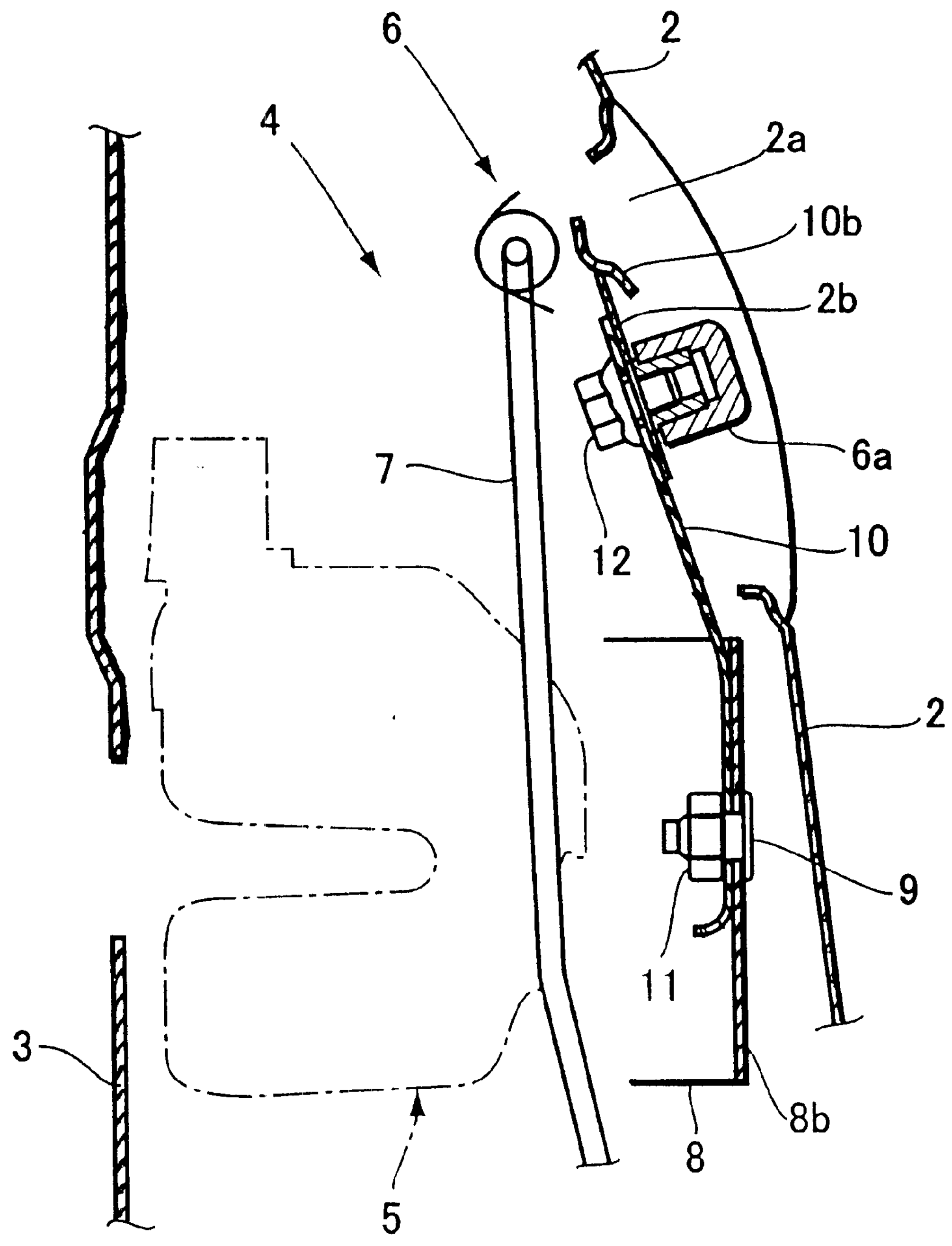
FIG. 8 is a schematic sectional view taken along the line VIII–Viii of FIG. 6.

Subsequently, this vehicle door 1 is transported to a coating line for predetermined coating. Then, in an installation line, the handle bracket 10 is inserted through a work opening **3*a* formed in the door inner panel 3 toward the handle mount opening 2*a* formed in the door outer panel 2. Here, the hooks 10*b* formed on the two-way-branched upper ends of this handle bracket 10 are latched onto the upper edges of the handle stations 2*b* formed in the handle mount opening 2*a*. Besides, the bolt 9 projected toward the door inner panel 3 from the bracket station 8*b* formed on the door latch reinforcement 8 is inserted into the long hole 10*d* formed in the lower edge of the handle bracket 10 for temporal fixing (see FIG. 6**).

The long hole **10*d* formed in the handle bracket 10 is shaped long in the longitudinal direction. Therefore, the bolt 9 can be left as inserted into this long hole 10*d* when the hooks 10*b* are latched onto the upper edges of the handle stations 2*b*, with excellent workability. Moreover, if the hooks 10*b* are off the upper edges of the handle stations 2*b*, the holes 10*c* formed in the handle bracket 10 get out of alignment with the screw-setting holes 2*c* formed in the handle stations 2*b*. This precludes screw setting, thereby facilitating the judgement of assembly failures. Furthermore, the long hole 10*d* can absorb assembly errors between the handle stations 2*b* and the handle bracket 10**, for easier fabrication and assembly.

Then, the nut 11 is screwed onto the bolt 9 by using a wrench inserted through the latch mount opening 8*a*, so that one of the lower ends of the handle bracket 10 is fixed to the backside of the bracket station 8*b*.

Next, the door latch unit 5 is inserted to the interior through a work opening 3*a* formed in the door inner panel 3, and fixed to the door latch reinforcement 8.

Subsequently, the handle unit 6 is mounted from exterior onto the handle mount opening 2*a* which is made in the door outer panel 2. Here, the threaded portions 6*a* formed on both back ends of the escutcheon (not shown) arranged on this handle unit 6 are brought into contact with the surface of the handle stations 2*b*.

It follows that the threaded portions 6*a* and the screw-setting holes 2*c* and 10*c* formed in the handle stations 2*b* and the handle bracket 10 come into concentric arrangements. From the backside of the handle bracket 10, the bolts 12 are screwed into the threaded portions 6*a* via these holes 2*c* and 10*c*, whereby the bolts 12 and the threaded portions 6*a* arranged on the handle unit 6 sandwich and fix the top portions of the handle bracket 10 and the bracket stations 8*b*.

As a result, the escutcheon arranged on the handle unit 6 is fit into the handle mount opening 2*a* in the door outer panel 2, whereby the outer handle rotatably supported by this escutcheon is exposed to the exterior of the door outer panel 2.

Thereafter, the handle unit 6 and the door latch unit 5 are connected to each other via the rod 7 to complete the assembly of the door lock device 4.

The vehicle door 1 completed thus is rotatably supported at its front portion by a front pillar via the door hinge.

When the vehicle door 1 is closed, the door latch unit 5 fixed to the rear surface of the door outer panel 2 via the door latch reinforcement 8 comes into engagement with the door striker (not shown) fixed to the center pillar, thereby maintaining the closed state.

On the other hand, when the outer handle mounted on the handle unit 6 is pulled, the door latch unit 5 is operated via the rod 7 to release the engagement with the door striker, making the vehicle door 1 openable.

At the occasion of the outer handle pulling, the escutcheon supporting this outer handle has the handle bracket 10 screwed on its backside, and this handle bracket 10 is fixed to the door latch reinforcement 8. Therefore, even if the outer handle is pulled somewhat forcedly so that the rotational momentum force from this outer handle deforms the escutcheon-supporting handle stations 2*b*, it is only a small portion of the handle bracket 10 which shows between the handle mount opening 2*a* and the escutcheon. Since the interior thereof cannot be seen therefrom directly, this arrangement prevents the appearance of vehicle from being marred.

Moreover, even though the escutcheon is intentionally forced open to make a gap between the escutcheon and the handle mount opening 2*a*, the handle bracket 10 opposed inside can function as a baffle board to prevent the door latch unit 5 from being operated through the gap.

By the way, even when a sideways minor impact deforms the door outer panel 2, the handle unit 6 will be hardly deformed except some deformation of the handle bracket 10 since the escutcheon thereof is a cast article and thus has excellent toughness. Besides, such a minor impact can deform the door outer panel 2 but hardly deform the door inner panel 3.

Accordingly, even if the vehicle door 1 undergoes a sideways minor impact, the door latch unit 5 directly fixed to the door latch reinforcement 8 and the handle unit 6 connected to this door latch reinforcement 8 via the handle bracket 10 will not make a substantial deviation in their relative positions. This makes it possible to actuate the door latch unit 5 normally through the operation of the outer handle arranged on the handle unit 6 even after the minor impact.

Since the handle unit 6 is hardly deformed by minor impacts, economical repairs can be made by simply replacing the handle bracket 10 alone and reusing the door lock device 4 as it is.

As has been described, according to the present embodiment, the handle unit 6 is supported via the handle bracket 10 by the door latch reinforcement 8 which makes no deformation even under sideways minor impacts. Therefore, even if the door outer panel 2 is deformed by a sideways minor impact, the handle unit 6 and the door latch unit 5 directly connected to the door latch reinforcement 8 are prevented from making a substantial deviation in their relative positions, so that the door latch unit 5 can be normally operated from the outer handle arranged on the handle unit 6.

Besides, the door latch reinforcement 8 and the handle bracket 10 are separate members. Therefore, when the handle bracket 10 is deformed by a sideways minor impact, this handle bracket 10 can be replaced alone to avoid the replacement of the entire door lock device 4 for easy and economical repair.

Moreover, the handle unit 6 is supported via the handle bracket 10 by the door latch reinforcement 8 for higher rigidity. This allows the door outer panel 2 to be reduced in relative thickness or to use a light alloy panel for the sake of weight reduction of the door outer panel 2.

Furthermore, the individual units 5 and 6 constituting the door lock device 4 are formed as separate members. As a result, the specifications of the parts constituting the door lock device 4 become sharable for easier parts control.

According to the first aspect of the present invention, the handle unit is connected via the handle bracket to the door latch reinforcement which causes no deformation under sideways minor impacts. This avoids any substantial shift in the relative positions of the door latch unit fixed to this door latch reinforcement and the handle unit, making it possible to maintain the relative positions of the two units constant. Therefore, the door latch unit can be normally actuated through the outer handle operation. Moreover, the simple structure with just an additional handle bracket allows easy and low-cost fabrication.

According to the second aspect of the present invention, the latching parts are formed on the handle bracket. Therefore, at the occasion of assembly, these latching parts can temporarily fix the handle bracket to the handle stations for improved workability.

According to the third aspect of the present invention, the long hole is formed in the handle bracket at a portion coming into contact with the bracket station, and the handle bracket is fastened to the bracket station via the long hole. This long hole can absorb the assembly errors in the relative positional relationship between the handle bracket and the bracket station, thereby facilitating the fabrication and assembly.

According to the fourth aspect of the present invention, the bolt to be inserted through the long hole formed in the handle bracket is projected from the bracket station, and the latch mount opening formed in the door latch reinforcement is opposed to the extremity of this bolt. Therefore, a tool can be inserted through this latch mount opening to fasten the nut to be screwed on the bolt with higher workability.

While there has been described what are at present considered to be preferred embodiments of the present invention, it will be understood that various modifications may be made thereto, and it is intended that the appended claims cover all such modifications as fall within the true spirit and scope of the invention.

What is claimed is:

1. A locking device comprising;

handle stations each mounted on a respective side of a handle mount opening in a vehicle door outer panel;

a handle unit engaged with said handle stations for mounting said handle unit to said door outer panel and pivotally supporting an outer handle;

a door latch reinforcement fixed to a vehicle door inner panel joined to said door outer panel;

a door latch unit fixed to said door latch reinforcement;

a rod for connecting said handle unit and said door latch unit;

a bracket station formed by extending said door latch reinforcement along an inner surface of said door outer panel; and a handle bracket;

wherein said handle bracket is non-movably fixed at a lower end thereof to said bracket station, and at an upper end thereof to said handle stations to connect said bracket station to said handle stations.

2. The locking device according to claim 1, wherein latching parts for fixing said handle bracket to said handle stations is formed on said handle bracket.

3. The locking device according to claim 2, wherein said handle bracket has a hole at said lower end thereof contacting with said bracket station; and said handle bracket is fastened to said bracket station via said hole.

4. The locking device according to claim 3, further comprising:

a bolt inserted through said hole and projected from said bracket station toward said door inner panel so as to fasten said handle bracket to said bracket station;

wherein said door latch reinforcement has a latch mount opening.

5. The locking device according to claim 1, wherein said handle bracket has a hole at said lower end thereof contacting with said bracket station; and said handle bracket is fastened to said bracket station via said hole.

6. The locking device according to claim 5, further comprising:

a bolt inserted through said hole and projected from said bracket station toward said door inner panel so as to fasten said handle bracket to said bracket station;

wherein said door latch reinforcement has a latch mount opening.

* * * * *